Nov. 4, 1958 H. V. HESS ET AL 2,859,257
SPECIAL SOLID ADSORBENT MATERIAL AND
PROCESS EMPLOYING THE SAME
Filed May 31, 1955 4 Sheets-Sheet 1

Fig. 1.

United States Patent Office 2,859,257
Patented Nov. 4, 1958

2,859,257
SPECIAL SOLID ADSORBENT MATERIAL AND PROCESS EMPLOYING THE SAME

Howard V. Hess, Glenham, and Edward R. Christensen, Beacon, N. Y., assignors to The Texas Company, New York, N. Y., a corporation of Delaware Application May 31, 1955, Serial No. 511,952

11 Claims. (Cl. 260—676)

This invention relates to a method of fractionating mixtures and to special solid selective adsorbents. More particularly, this invention relates to an adsorption separation process employing special adsorbent materials. In accordance with one embodiment this invention relates to special solid adsorbents and to a method employing the same for fractionating hydrocarbon mixtures, such as hydrocarbon mixtures containing straight chain hydrocarbons and non-straight chain hydrocarbons.

Various processes have been proposed and employed for the fractionation of mixtures into their various components. For example fractional distillation, fractional crystallization, extractive distillation, extractive crystallization (urea complex formation), solvent extraction and selective adsorption have been proposed and employed to effect fractionation of mixtures containing close boiling or otherwise closely related compounds. For the most part these separation processes rely upon some difference in physical properties such as boiling point or melting point, or some difference in chemical properties, such as degree of unsaturation or aromaticity, in the materials being treated in order to effect separation thereof.

Certain materials, solid selective adsorbents, have also been proposed to effect a separation of materials based upon differences in molecular size or configuration. Solid selective adsorbents which fractionate mixtures according to the molecular size of the components therein have been conveniently termed "molecular sieves." For example, Barrer—U. S. 2,306,610 proposes to effect separation between straight chain hydrocarbons and non-straight chain hydrocarbons by contacting a mixture containing the same with a special selective adsorbent, a porous crystalline zeolite the crystals of which possess pores of uniform molecular dimension, about 5 Angstrom units, which permit the entry and adsorption of straight chain hydrocarbons, such as normal paraffins, to the substantial exclusion of non-straight chain hydrocarbons, such as isoparaffins, isoolefins, naphthenes and aromatic hydrocarbons. Other solid adsorbent materials which function in the manner of a molecular sieve have also been proposed.

Certain other solid selective adsorbents, although not of the molecular sieve type, have also been employed to separate mixtures, such as hydrocarbon mixtures, according to chemical type or in accordance with molecular weight. For example, silica gel has been employed to separate hydrocarbon mixtures according to chemical type, e. g. the separation of aromatic hydrocarbons from non-aromatic hydrocarbons, for the separation of unsaturated hydrocarbons, such as olefins, from saturated hydrocarbons, such as paraffins. Activated charcoal or carbon has been employed as a selective adsorbent to separate unsaturated hydrocarbons from saturated hydrocarbons, e. g. ethylene from ethane, and has also been employed to separate relatively high molecular weight hydrocarbons, e. g. butane and pentane, from relatively low molecular weight hydrocarbons, e. g. methane and ethane.

All the above-mentioned solid selective adsorbents, such as activated carbon, silica gel and the zeolite or aluminosilicate type molecular sieve adsorbents are relatively fragile solid materials possessing little structural strength and are readily and easily crushed and reduced to a powder. This lack of structural strength and ability to resist attrition and crushing has militated against employing such solid adsorbents in adsorption separation processes wherein the solid adsorbent is moved from one zone to another zone, such as from an adsorption zone to a desorption zone. In fact, in the case of the alumino-silicate molecular sieve type of adsorbents the loss of solid adsorbent material due to attrition and crushing has been prohibitive heretofore with respect to the use of these materials in a moving bed system or in a fluidized system.

Accordingly it is an object of this invention to provide an improved selective adsorption separation process for the fractionation of mixtures.

Another object of this invention is to provide special adsorbents suitable for use in a moving bed or fluidized system.

Another object of this invention is to provide an improved selective adsorption process wherein special adsorbent materials which are normally fragile and easily crushed, are protected against crushing and attrition.

Still another object of this invention is to provide an improved method for desorbing adsorbed materials from solid selective adsorbents.

How these and other objects of this invention are accomplished will become apparent with reference to the accompanying disclosure and drawings wherein:

Figs. 2–5 schematically illustrate selective adsorption processes employing specialized adsorbents in accordance with this invention.

In at least one embodiment of this invention at least one of the foregoing objects will be achieved.

In accordance with our invention solid adsorbent materials, such as solid selective adsorbents which are relatively fragile and are relatively easily crushed, are encapsulated within a protective porous envelope. The porous encapsulating envelope desirably possesses sufficient structural strength and rigidity to protect the solid adsorbent materials contained therein from being crushed. Also, desirably, the porous envelope should be of such size and shape so that a mass of such materials is relatively free-flowing and/or is suitable for use in an adsorptive separation process employing a moving bed, a falling bed or fluidized bed of such materials.

In accordance with another aspect of this invention the special encapsulated adsorbents are regenerated or desorbed of their adsorbed materials by contact with a high temperature liquid which is non-wetting with respect to the adsorbent.

Although, as indicated hereinbefore, the practice of this invention is applicable to any solid selective adsorbent which possesses relatively little structural strength and ability to resist crushing and attrition, for purposes of simplicity and ease of understanding particular emphasis will be placed in this disclosure on the applicability of this invention to the molecular sieve type of solid adsorbents, such as the alumino-silicate type of solid adsorbents which selectively absorb straight chain hydrocarbons to the substantial exclusion of non-straight chain hydrocarbons.

Certain natural or synthetic zeolites or alumino-silicates, such as calcium alumino-silicate, exhibit the properties of a molecular sieve adsorbent in that they are made up of porous crystals wherein the pores of the crystals are of molecular dimension and are of substantially uniform size. These materials may be described as water-containing alumino-silicates having the formula $(R,R'_2)O.Al_2O_3.nSiO_2.mH_2O$ wherein R may be an alkaline earth metal such as calcium, strontium or barium or even magnesium and wherein R' is an alkali metal such as sodium or potassium or lithium. Generally the above-described materials, when treated for the removal of substantially all of the water therefrom, retain their crystal structure and are particularly suitable as selective adsorbents such as for the selective adsorption of straight chain hydrocarbons to the substantial exclusion of non-straight chain hydrocarbons.

A particularly suitable solid adsorbent for straight chain hydrocarbons and suitable for use in the practice of this invention is a calcium alumino-silicate, apparently actually a sodium calcium alumino-silicate, manufactured by Linde Air Products and designated Linde Type 5A Molecular Sieve. The crystals of this particular calcium alumino-silicate have a pore size or opening of about 5 Angstrom units, sufficiently large to admit straight chain hydrocarbons, such as the normal paraffins and the normal olefins, to the substantial exclusion of the non-straight chain hydrocarbons. This particular selective adsorbent is available in various sizes, e. g. in the form ⅛" or 1/16" diameter pellets or as a finely divided powder having a particle size in the range 0.5–5.0 microns.

The selective adsorbent employed in the practice of this invention may be of any suitable form or shape, granular, spheroidal or microspheroidal. Other suitable solid molecular sieve type of adsorbents which may be employed in the practice of this invention include the synthetic or natural zeolites which, when dehydrated, may be described as crystalline zeolites having a rigid three dimensional anionic network and having interstitial dimensions sufficiently large to preferentially adsorb one particular type of hydrocarbon, e. g. straight chain hydrocarbons, to the substantial exclusion of other type of hydrocarbons, e. g. the non-straight chain hydrocarbons. The naturally occurring zeolite, chabazite, exhibits the property of selectively adsorbing straight chain hydrocarbons. Another suitable naturally occurring zeolite, analcite, $NaAlSi_2O_6.H_2O$, when dehydrated or when all or part of the sodium is replaced by an alkaline earth metal, such as calcium, by base exchange, yields a material represented by the formula $(Ca,Na)_2Al_2Si_4O_{12}.2H_2O$ which, after suitable conditioning, will adsorb straight chain hydrocarbons to the substantial exclusion of non-straight chain hydrocarbons. Other naturally occurring synthetically prepared zeolites or alumino-silicates, such as phacolite, gmelinite, harmotome and the like or suitable base exchange modifications of these materials may also be employed as selective adsorbents in the practice of this invention.

In carrying out an adsorption separation process in accordance with this invention any suitable adsorption temperature may be employed. It is preferred, however, to maintain adsorptive separation conditions, e. g. temperature and/or pressure, such that the materials undergoing adsorptive separation are in the vapor phase. Generally the adsorptive separation operation is carried out at a temperature in the range 50–800° F. sufficient to effect the adsorptive separation of the desired component from the mixture undergoing fractionation, e. g. the separation of straight chain hydrocarbons from non-straight chain hydrocarbons. Moreover the adsorptive separation operation may be carried out at any suitable pressure, such as a pressure in the range 0–10,000 p. s. i. g., higher or lower, the temperature and pressure being adjusted with respect to the mixture undergoing fractionation so as to maintain the mixture in the vapor phase during the adsorptive separation operation. Generally, particularly with respect to the alumino-silicate type of adsorbents, it is preferred to carry out the adsorptive separation operation at a temperature in the range 200–725° F.

After the adsorbent has been substantially saturated with respect to the preferentially adsorbed component the saturated adsorbent is subjected to a relatively elevated temperature sufficiently high to effect desorption of the preferentially adsorbed components from the adsorbent, which may be encapsulated in a porous medium, by contacting the adsorbent with a high temperature liquid which is non-wetting with respect to the adsorbent, but which is preferably wetting with respect to the encapsulating medium. As a general rule in the case of alumino-silicate adsorbents a desorption temperature in the range 400–1300° F. is satisfactory. Preferably the desorption temperature should be at least about 100° F. higher than the adsorption temperature, usually in the range 100–400° F. higher than the adsorption temperature. Furthermore, it is preferred to carry out the desorption operation at a temperature and pressure such that the resulting desorbed materials are in the gaseous phase. Generally a desorption pressure in the range of 10–2,000 p. s. i. g., higher or lower, is satisfactory. It is sometimes desirable to carry out the desorption operation at a pressure substantially lower than the adsorption pressure. Isobaric adsorption-desorption operations are also advantageous in some instances; however the pressure employed during the adsorptive separation operation is not determinative of the desorption pressure.

With respect to the desorption temperature, particularly when an alumino-silicate molecular sieve type of adsorbent is employed, it is generally preferred to carry out the desorption operation at a temperature in the range 700–1100° F. In such instances the desorption temperature should not be excessively high, for example not greater than about 1100–1300° F., particularly in the instance where a material such as Linde Type 5A Molecular Sieve (a calcium alumino-silicate) is employed since these rather high temperatures are excessive and lead to the destruction of the slelective adsorbent, presumably by collapse of the crystal structure with resultant loss of selective adsorption properties. Furthermore, it is mentioned that the adsorption temperature and particularly the desorption temperature should not be excessively high in the sense that the protective porous encapsulating envelope surrounding discrete masses of the selective adsorbent is destroyed or otherwise damaged.

With respect to the porous encapsulating envelope surrounding or containing discrete masses of the relatively fragile selective adsorbent material it is preferred that the envelope be sufficiently rigid or possess sufficient structural strength to protect the encapsulated adsorbent from crushing or attrition. Furthermore the encapsulating envelope must be porous to the mixture undergoing fractionation, that is the pores or openings in the encapsulating envelope must be sufficiently large to permit penetration of the mixture of components undergoing separation but sufficiently small to prevent escape or loss of the encapsulated adsorbent material. Suitable materials which may comprise the encapsulating envelope are perforated or porous sheet material, such as perforated sheet metal, or wire mesh such as stainless steel wire mesh, ordinary steel wire mesh, glass fibers or any other suitable ceramic or metallic materials capable of withstanding high temperatures such as a temperature in the range 400–1100° F. The encapsulating envelope should be inert with respect to the adsorbent and the mixture undergoing fractionation and moreover should be substantially inert or unaffected by the hot desorbing liquid which is employed in the desorption operation. Preferably, however, the encapsulating envelope has a relatively high coefficient of heat transfer and is made of a material or possesses a surface which is wetting with respect to the high temperature desorbing liquid so as to permit ready penetration of the hot desorbing liquid through the porous envelope into direct contact with the adsorbent material contained therein.

Briefly, an improved process for fractionating a mixture in accordance with our invention comprises contacting said mixture preferably in the vapor phase with a solid selective adsorbent for one of the components of said mixture, said adsorbent being contained within a porous envelope whereby said mixture penetrates the pores of said envelope and at least a portion or a component of said mixture is preferentially adsorbed by said adsorbent and contacting the encapsulated adsorbent containing a portion of said mixture adsorbed therein with a high temperature desorbing liquid whereby the encapsulated adsorbent is subjected to a relatively high temperature with resultant desorption of the adsorbed components therefrom.

Preferably in accordance with the practice of our invention the desorbing liquid is a high temperature liquid which directly contacts the encapsulated adsorbent. The desorbing liquid should be substantially inert not only with respect to the adsorbent material but also the porous envelope. The desorbing liquid should be capable of being heated to a relatively high temperature, such as a temperature in the range 600–1100° F. or higher without any decomposition and without exhibiting any substantial vapor pressure, such as a vapor pressure above about 500 mm. Hg, at the actual desorption temperature. As indicated hereinabove, the desorbing liquid should be non-wetting with respect to and substantially unadsorbed by the solid adsorbent material encapsulated within the porous envelope. If desired the high temperature desorbing liquid may be non-wetting with respect to the encapsulating envelope but it is preferred, however, to employ a desorbing liquid which is wetting with respect to the porous encapsulating envelope so as to permit ready penetration of the pores of the envelope for subsequent contact with the adsorbent contained therein. The desorbing liquid desirably should not exhibit any solvent properties with respect to the porous envelope or with respect to the solid adsorbent contained therein. It is mentioned in order to promote heat transfer from the hot desorbing liquid to the solid adsorbent material undergoing desorption it is desirable that the porous envelope be readily heat-conductive, that is, preferably a metallic material. Desorbing liquids suitable for use in the practice of our invention are Wood's metal, a low melting point alloy (M. P. about 70° C.) of Bi—Pb—Sn—Cd, Lipowitz metal, white metal, eutectic alloy, eutectic fusible alloy, bismuth, amalgam, bismuth solder, mercury, sodium, potassium, lead, as well as other low melting point materials or alloys (melting point in the range 47–290° C.), such as alloys comprising Pb and Sn together with varying amounts of Bi and Cd. The abovementioned materials are readily liquefied and many can be maintained in the liquid state at a temperature below about 200° C., even below about 100° C. Furthermore, the abovementioned desorbing liquids are substantially immiscible with respect to the materials contained adsorbed in the adsorbent (desorbate).

Figure 1:
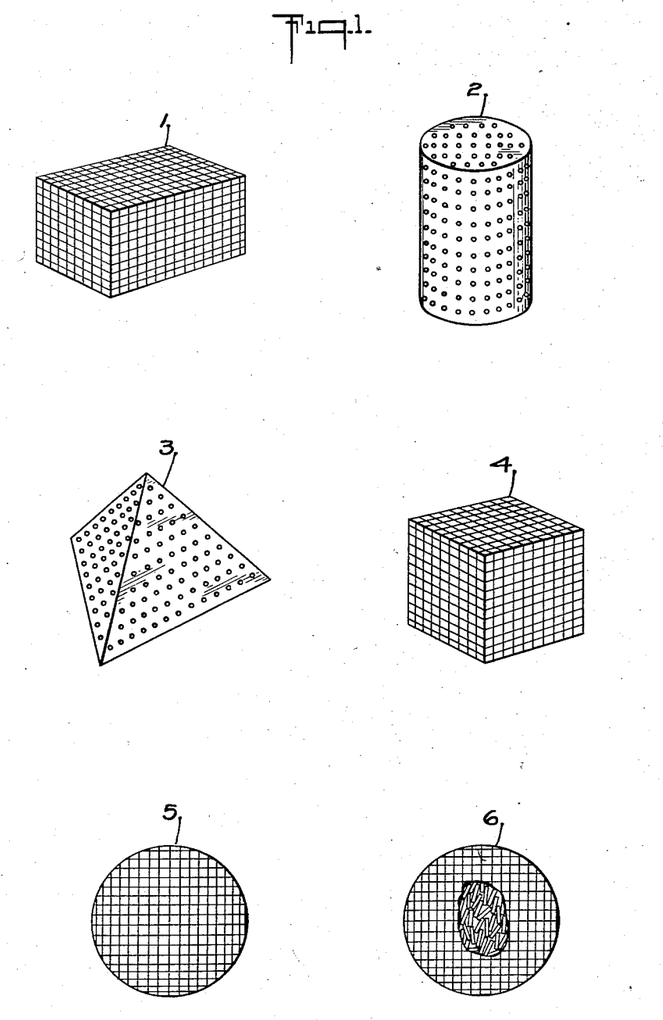
Fig. 1 illustrates examples of various special adsorbent materials in accordance with this invention.

Referring now to the drawings and particularly to Fig. 1 which illustrates various embodiments of encapsulated adsorbents in accordance with our invention, it is to be noted that reference numeral 1 indicates an encapsulated adsorbent wherein the encapsulating envelope is a wire mesh having the shape of a rectangular prism. Reference numeral 2 indicates an encapsulated adsorbent having the shape of a cylinder. Reference numerals 3 indicates an encapsulated adsorbent having the shape of a pyramid. Reference numeral 4 indicates an encapsulated adsorbent having the shape of a cube. Reference numeral 5 indicates an encapsulated adsorbent having the shape of a sphere and reference numeral 6 identifies a cutaway view of a spheroidal encapsulated adsorbent illustrating that the adsorbent material contained or packed or positioned therein as a compact mass so that relatively little movement of the adsorbent material is possible within the porous envelope thereby reducing loss of adsorbent material due to attrition.

As indicated in Fig. 1, the encapsulated adsorbent may assume any suitable shape, preferably a shape which permits a mass of the thus encapsulated adsorbent material to be relatively free-flowing.

Figure 2:
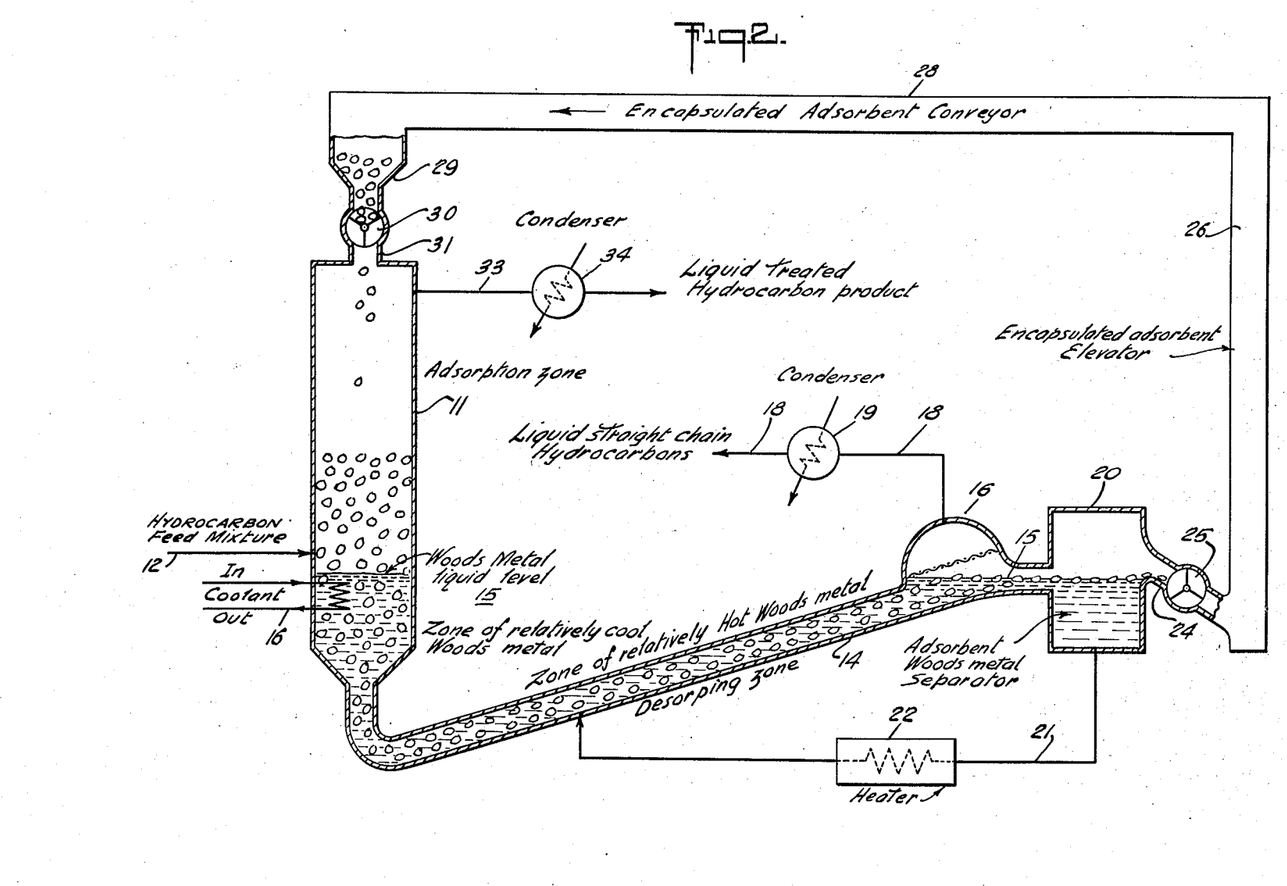

Referring now to Fig. 2 of the drawings, there is schematically illustrated one embodiment of the practice of our invention wherein an adsorption zone 11 is provided with a mass of encapsulated adsorbent, see Fig. 1, said adsorbent in this instance being a selective adsorbent for straight chain hydrocarbons to the substantial exclusion of non-straight chain hydrocarbons. Into the lower portion of adsorption zone 11 via conduit 12 there is injected a mixture of hydrocarbons, such as a naphtha fraction containing straight chain hydrocarbons and non-straight chain hydrocarbons and having a boiling range in the range 50–450° F. Adsorption zone 11 is maintained at a suitable temperature and pressure, e. g. temperature in the range 400–725° F. and pressure in the range 0–200 p. s. i. g., such that the hydrocarbon feed mixture introduced thereinto via conduit 12 is maintained in the vapor phase. The lower portion of adsorption zone 11 beneath inlet conduit 12 is in fluid communication with desorption zone 14 which comprises a relatively elongated zone or cylinder extending slantingly upward from the lower portion of adsorption zone 11. Desorption zone 14 is maintained substantially full with hot desorbing liquid, e. g. molten Wood's metal, at a temperature substantially above the temperature maintained in adsorption zone 11. The upper level of the molten Wood's metal with adsorption zone 11 and desorption zone 14 is indicated by reference numeral 15. Advantageously the molten Wood's metal present in the lower portion of the adsorption zone is maintained relatively cool, such as at about the temperature of adsorption zone 11, by means of heat exchanger 16 which is provided with a suitable coolant such as low pressure steam or hot water. The upper, other end of desorption zone 14 is provided with a chamber for the collection of vapors which are withdrawn therefrom via conduit 18 and condenser 19. Said upper, other end of desorption zone 14 is in fluid communication with a solids-liquid separator 20 wherein the molten Wood's metal flowing from desorption zone 14 is separated from the encapsulated adsorbent floating on the surface thereof, the molten Wood's metal being recycled from separator 20 via conduit 21 and heater 22 back to desorption zone 14. The encapsulated adsorbent separated in the solids-liquid separator 20 passes via conduit 24 and solids outlet control device or valve 25, such as a star valve, into adsorbent elevator 26 where it is passed to adsorbent conveyor 28 which supplies adsorbent hopper 29 from which the adsorbent enters the adsorption zone 11 via valve 30 and conduit 31.

In carrying out the invention in accordance with the process schematically illustrated in Fig. 2 the straight chain hydrocarbons are selectively adsorbed from the hydrocarbon mixture introduced into adsorption zone 11 via conduit 12, the encapsulated adsorbent in adsorption zone 11 comprising an alumino-silicate adsorbent, such as Linde No. 5A Molecular Sieve, for straight chain hydrocarbons. The resulting treated hydrocarbon mixture, now having a substantially reduced straight chain hydrocarbon content is removed from the upper end of adsorption zone 11 via conduit 33 and condenser 34 from which a liquid treated hydrocarbon product is recovered.

The encapsulated adsorbent moves downwardly within adsorption zone 11, moving through a body of relatively cool molten Wood's metal maintained in the lower portion of adsorption zone 11 and enters desorption zone 14 which is maintained at a relatively high temperature, e. g. a temperature in the range 600–1,000° F. It is mentioned that the relatively cool molten Wood's metal located in the lower portion of adsorption zone 11 is at a temperature substantially the same as the adsorption temperature and substantially below the actual desorption temperature maintained in desorption zone 14. Upon passing upwardly through desorption zone 14 (the encapsulated adsorbent being less dense than the molten Wood's metal tends to float) the preferentially adsorbed straight chain hydrocarbons are desorbed from the encapsulated adsorbent and recovered in the vapor phase from vapor collection chamber 16 via conduit 18 and condenser 19 for the eventual recovery of a liquid straight chain hydrocarbon product. The resulting desorbed encapsulated adsorbent together with the hot molten Wood's metal issue from desorption zone 14 into liquid-solids separator 20. The molten Wood's metal recovered from separator 20 is recycled to desorption zone 14 via conduit 21 and heater 22 which serves to bring the temperature of the molten Wood's metal flowing therethrough up to the desorption temperature maintained within desorption zone 14. The desorbed encapsulated adsorbent floats upon the surface 15 of the molten Wood's metal within separator 20 and is removed via conduit 24 and solids flow regulating device or star valve 25 through which it passes to adsorbent elevator 26 which elevates the desorbed adsorbent to conveyor 28 which carries the desorbed adsorbent into hopper 29 from which it is supplied via flow regulating device 30 and conduit 31 back to adsorption zone 11.

It is mentioned that despite the fact that the encapsulated adsorbent has a lower density than the molten Wood's metal and accordingly floats on the surface of the Wood's metal, as illustrated in Fig. 2, movement of the encapsulated adsorbent downwardly through the body of molten Wood's metal maintained in the lower portion of adsorption zone 11 is possible due to the weight of the overlying mass of encapsulated adsorbent. By operating in the above manner it is evident that the desorption of the adsorbed straight chain hydrocarbons is accomplished without the use of a gaseous desorbing or purging medium with the result that the recovery of the resulting desorbed straight chain hydrocarbons is greatly simplified and the encapsulated adsorbent material is substantially unchanged and is returned to the adsorption zone in a substantially completely regenerated condition without requiring any additional treatment before being contacted with additional hydrocarbon mixture. Furthermore, it is to be noted that by carrying out an adsorption-desorption separation operation as illustrated in Fig. 2 substantially isobaric adsorption-desorption conditions are conveniently and easily maintained within adsorption zone 11 and desorption zone 14.

Referring now to Fig. 3 of the drawings which schematically illustrates another process in accordance with our invention somewhat similar to the process schematically illustrated in Fig. 2, a hydrocarbon feed mixture containing straight chain hydrocarbons and non-straight chain hydrocarbons is introduced via conduit 50 into adsorption zone 51 under conditions of temperature and pressure such that the introduced hydrocarbon feed mixture is maintained in the gaseous phase in contact with a downward moving mass of encapsulated adsorbent 52 comprising a material which preferentially adsorbs a component of said hydrocarbon feed mixture. Solids flow control means, such as star valves 54 and 55, are provided at the upper and lower end of adsorption zone 51, respectively. By means of solids flow regulating means 55 a controlled amount of encapsulated adsorbent 52 is permitted to enter into desorption zone 56 which comprises a substantially box-shaped structure provided with a vapor collection dome 58 and a bucket conveyor 59 operative therein and moving in the direction indicated by the arrow. As the encapsulated adsorbent enters desorption zone 56 it is carried by the conveyor buckets 59a and immersed and moved through a bath of hot desorbing liquid such as molten Wood's metal, the surface of which is indicated at 60, with the result that the component preferentially adsorbed by the encapsulated adsorbent is desorbed and collected in vapor collection dome 58 from which it is recovered via line 61 and condenser 62. The encapsulated adsorbent is moved beneath the surface 60 of the molten Wood's metal and released at the other end of desorption zone 56 wherein it floats to the surface of the molten Wood's metal. Internal baffle 64 extending beneath the surface 60 of the molten Wood's metal is provided to prevent escape of the resulting desorbed material with the desorbed regenerated adsorbent which is removed from adsorption zone 56 via conduit 65 and solids flow control means 66 from which it discharges into adsorbent elevator 68 wherein it is passed to adsorbent conveyor 69 which in turn transfers the thus desorbed, regenerated encapsulated absorbent to conduit 70 for reintroduction via flow control means 54 into adsorption zone 51. The upper end of adsorption zone 51 is provided with an outlet conduit 71 and condenser 72 for the recovery of the treated hydrocarbon mixture.

It is pointed out that one feature of the apparatus schematically illustrated in Fig. 3 is that the adsorption zone 51 and the desorption zone 56 are substantially isolated from each other so that a differential pressure may be conveniently maintained between the adsorption and desorption zones. Further, the desired desorption temperature is maintained within desorption zone 56 by the continuous withdrawal of molten Wood's metal therefrom via conduit 74 and returned to desorption zone 56 via inlet conduit 75 after having passed through heater 76.

Figures 4, 5:
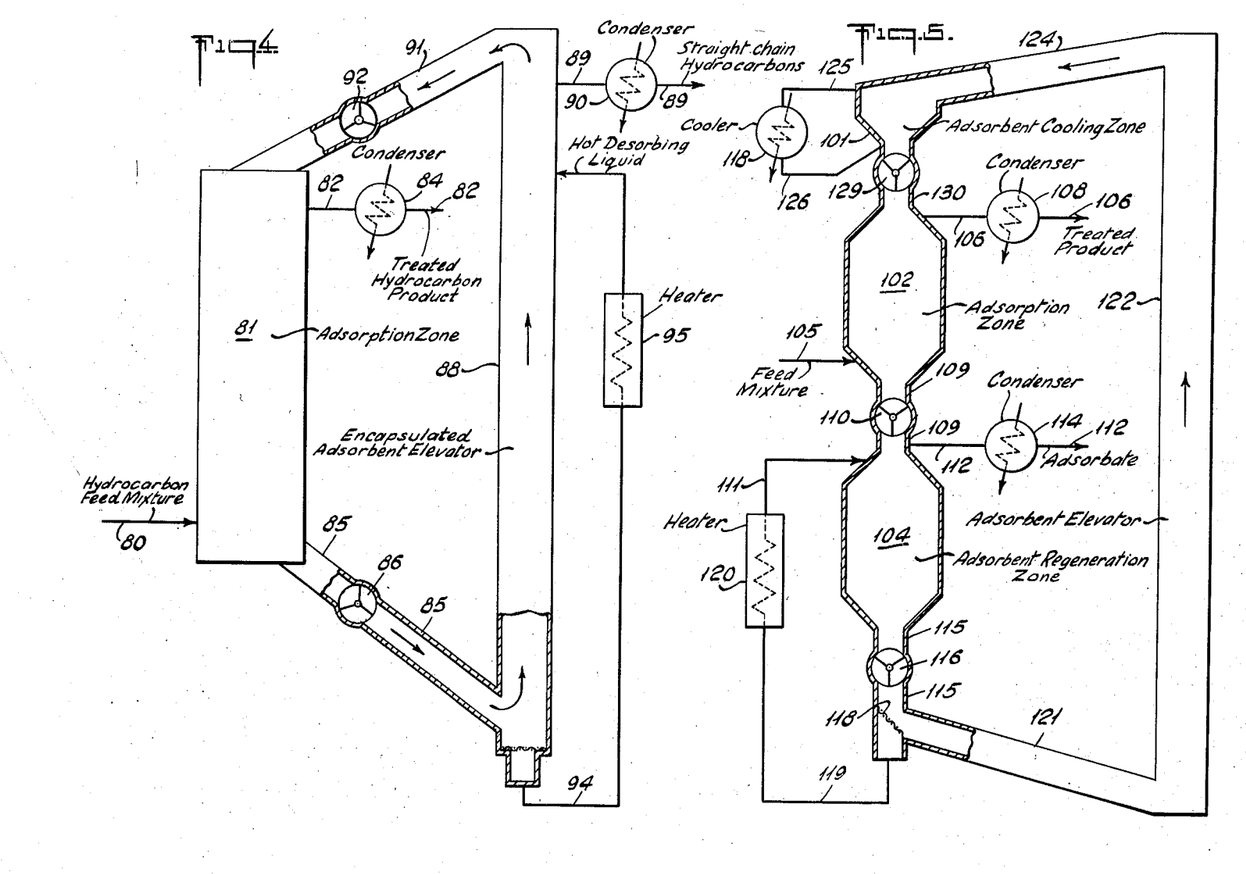
Figure 5:
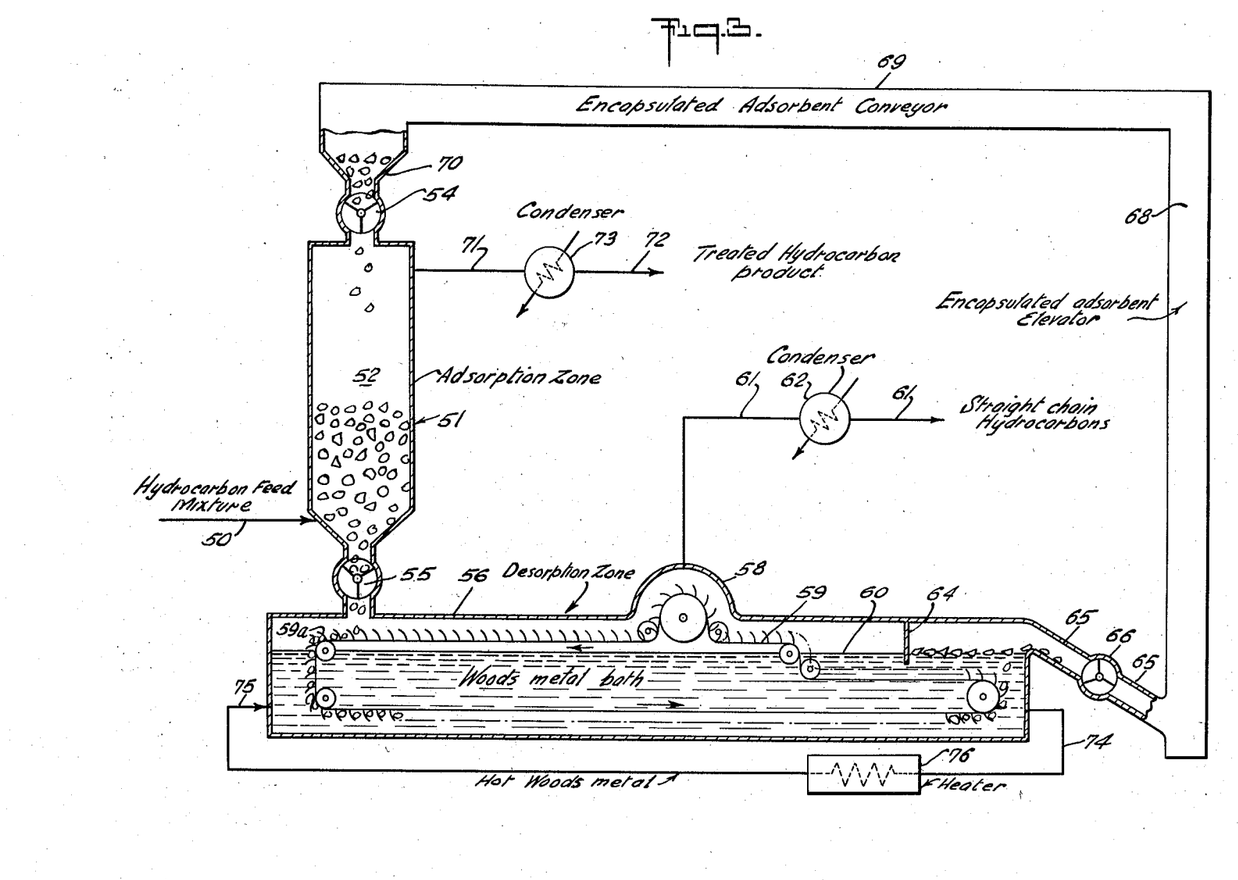

Referring now to Fig. 4 of the drawings which schematically illustrates another process in accordance with our invention said process capable of being carried out with a minimum of apparatus and equipment. In accordance with the process schematically illustrated in Fig. 4 a vaporized hydrocarbon feed mixture containing, for example, straight chain hydrocarbons and non-straight chain hydrocarbons is introduced via conduit 80 into adsorption zone 81 where it is countercurrently contacted with freely falling encapsulated adsorbent such as an alumino-silicate adsorbent which preferentially adsorbs straight chain hydrocarbons to the substantial exclusion of non-straight chain hydrocarbons, or wherein the hydrocarbon feed mixture countercurrently contacts a downward moving mass of encapsulated adsorbent. The resulting treated hydrocarbon mixture, now substantially free of straight chain hydrocarbons is recovered from adsorption zone 81 via outlet conduit 82 and condenser 84. The encapsulated adsorbent leaves adsorption zone 81 via conduit 85 and solids flow control means 86 through which it passes to adsorbent elevator 88 provided with suitable elevating means, such as perforated buckets and the like, wherein it is moved upwardly in direct countercurrent contact with a downward flowing body or freely-falling mass of hot desorbing liquid, such as hot molten Wood's metal and the like. The resulting desorbed straight chain hydrocarbons are recovered from desorption zone 88 via outlet conduit 89 and condenser 90. The resulting desorbed regenerated adsorbent is transferred from elevator 89 via conduit or conveyor 91 and solids flow control means 92 through which the regenerated adsorbent passes prior to reentering the top of adsorption zone 81.

Relatively cool molten Wood's metal is withdrawn from the lower end of elevator 88 via conduit 94. This relatively cool molten Wood's metal is brought up to the desired desorption temperature within heater 95 prior to reintroduction into the upper portion of combination elevator-desorption zone 88, as indicated.

Referring now to Fig. 5 of the drawings there is indicated therein three vertically-disposed, substantially in-line operational or contacting zones, an adsorbent cooling zone 101, an adsorption zone 102 and an adsorbent regeneration zone 104. A hydrocarbon fraction to be treated for the substantially complete removal of one of the components thereof is introduced into the adsorption zone 102 via conduit 105 and a resulting treated hydrocarbon product is recovered from the upper portion of adsorption zone 102 via conduit 106 and condenser 108. In accordance with this invention adsorption zone 102 is provided with a mass of encapsulated selective adsorbent. The encapsulated adsorbent containing a component of the hydrocarbon fraction selectively adsorbed therein moves from adsorption zone 102 into adsorbent regeneration zone 104 via conduit 109 and flow control means 110. Within adsorbent regeneration zone 104 the encapsulated adsorbent is contacted with a hot non-wetting liquid such as molten Wood's metal which is introduced into the upper portion of adsorbent regeneration zone 104 via conduit 111. As a result of so contacting the encapsulated adsorbent with the hot Wood's metal the hydrocarbon component selectively adsorbed within the encapsulated adsorbent is desorbed and recovered as a separate product from adsorbent regeneration zone 104 via conduit 112 and condenser 114. The resulting regenerated encapsulated absorbent zone together with the molten Wood's metal leave the lower end of regeneration zone 104 via conduit 115 and flow control means 116. A solids-liquids separating device such as screen 118 is provided at the lower portion of outlet conduit 115. By means of screen 118 the regenerated encapsulated adsorbent is separated from the molten Wood's metal which is separately recovered from outlet conduit 115 via conduit 119 and recycled after passing through heater 120 via conduit 111 back into the upper portion of the adsorbent regeneration zone 104. The hot regenerated encapsulated adsorbent moves from conduit 115 via conduit 121 to the lower end of elevator 122 which picks up the thus regenerated adsorbent and elevates the same to conduit 124 from which it is transferred to adsorbent cooling zone 101. Relatively cool molten Wood's metal for cooling the regenerated encapsulated adsorbent to the temperature maintained in the adsorption zone 102 is introduced into the upper portion of adsorbent cooling zone 101 via conduit 125. By suitable means the molten Wood's metal is separated from the resulting cooled adsorbent at the lower end of cooling zone 101 and the thus separated molten Wood's metal is recycled via conduit 126 and cooler 128 to conduit 125 for return to the upper portion of adsorbent cooling zone 101. The separately recovered cooled regenerated adsorbent is controlledly admitted into contacting zone 102 via flow control means 129 and conduit 130 which discharge into the upper end of contacting zone 102.

By operating in accordance with the process schematically illustrated in Fig. 5 separate adsorption-desorption zones are provided which zones can be separated at any desired suitable temperature or pressure.

The following is exemplary of the practice of our invention:

EXAMPLE I

A vaporized light straight run naphtha having a 70.6 clear ASTM Research Octane was contacted with a mass of alumino-silicate selective adsorbent (Linde Type 5A Molecular Sieve) which selectively adsorbs straight chain hydrocarbons to the substantial exclusion of non-straight chain hydrocarbons and the resulting treated product separately recovered. The solid alumino-silicate adsorbent now containing straight chain hydrocarbons (n-paraffins) adsorbed therein was immersed beneath the surface of a bath of hot molten Wood's metal for a sufficient period of time, about three minutes, to substantially completely desorb the adsorbed straight chain hydrocarbons which were separately recovered. Following the desorption-regeneration operation the thus-treated regenerated adsorbent was cooled, recycled to contact additional light straight run naphtha and again regenerated in the above-described manner. The results are set forth in Table No. 1.

Table No. 1

| Run | Treated Product Yield, Vol. Percent | Treated Product Res. Oct. Clear | Desorbate Yield, Vol. Percent | Br No. | Wood's Metal Temp., °F. |
|---|---|---|---|---|---|
| 1 (fresh adsorbent) | 82.1 | 73.7 | 6.0 | ------ | 700 |
| 2 | 93.6 | 73.3 | 5.0 | ------ | 750 |
| 3 | 93.0 | 73.1 | 6.6 | 6.3 | 800 |
| 4 | 90.4 | 73.1 | 6.8 | 6.2 | 800 |
| 5 | 93.4 | 73.3 | 6.2 | 6.8 | 800 |
| 6 | 92.6 | 73.7 | 6.6 | 6.5 | 800 |
| 7 | 97.2 | 73.4 | 6.6 | 8.5 | 850 |
| 8 | 87.2 | 73.3 | 7.0 | 4.6 | 850 |
| 9 | 90.1 | 74.0 | 7.8 | 6.3 | 850 |

Various gaseous mixtures may be treated in accordance with the process of this invention for the separation and recovery of one or more components therefrom. Mixtures which may be treated in accordance with this invention include gaseous mixtures containing normally gaseous or normally liquid polar and non-polar compounds or polar and relatively less polar compounds, e. g. gaseous streams containing $SO_2$, $H_2S$, $CO_2$, $NH_3$, acetylene, ethylene, propylene, etc. The practice of this invention is particularly applicable to the separation of gaseous mixtures of hydrocarbons, such as gaseous mixtures containing $C_1$, $C_2$, $C_3$ and/or $C_4$ hydrocarbons and the like. Petroleum refinery streams are also suitable for treatment in accordance with this invention, such as hydrocarbon mixtures containing straight chain hydrocarbons and non-straight chain hydrocarbons. Various hydrocarbon mixtures or petroleum fractions which may be advantageously treated include a naphtha or gasoline fraction, a diesel oil fraction, a kerosene fraction, a gas oil fraction and the like. A typical hydrocarbon fraction which may be treated for the removal of selected hydrocarbons or selected fractions therefrom might have a boiling point or boiling range in the range 40–600° F. and higher and containing a substantial amount of straight chain hydrocarbons, e. g. 2–3.5% by volume and higher. More particularly, a hydrocarbon fraction to be treated might have an initial boiling point in the range 40–300° F. and an end point in the range 150–600° F. and higher. A hydrocarbon fraction treated for the removal of straight chain hydrocarbons therefrom might have the following composition:

| Hydrocarbon type: | Percent by volume |
|---|---|
| Naphthenes | 0–75 |
| Aromatics | 0–75 |
| Acyclic saturates and unsaturates (including normal paraffins, isoparaffins, normal olefins and isoolefins) | 2–90 |

Typical petroleum refinery stocks or petroleum fractions which may be treated for the adsorptive separation of a component therefrom, such as aromatic hydrocarbons or straight chain hydrocarbons, include the wide boiling straight run naphtha, a heavy straight run naphtha, a light straight run naphtha, a catalytic cracked naphtha, a thermally cracked or thermally reformed naphtha, a catalytic reformed naphtha and the like.

It is an added feature of this invention that the desorption temperature be maintained not lower than the critical temperature of that component contained adsorbed in the selective adsorbent and possessing the highest critical temperature, i. e. the desorption temperature should be at least as high as, preferably higher than, the highest critical temperature of the components contained adsorbed in the adsorbent. This particular aspect is more completely described and disclosed in our co-pending patent application Serial No. 497,444, filed April 4, 1955.

As indicated hereinabove the selective adsorbent undergoing treatment in accordance with this invention by contact with a high temperature non-wetting desorbing liquid, such as a metallic alloy, e. g. Wood's metal, need not be encapsulated within a porous medium in order that desorption of the adsorbed components be effected. If desired the solid particle form selective adsorbent may be directly contacted with the high temperature non-wetting desorbing liquid so as to effect desorption of the adsorbed components therefrom. In accordance with this aspect of the invention, particularly when the solid particle form adsorbent material is relatively fragile, easily crushed or possesses little resistance to attrition, such as in the case of activated charcoal, silica gel or the molecular sieve type of alumino-silicate adsorbents, the solid particle form adsorbent material is maintained in a fixed bed, substantially no movement of the solid adsorbent material taking place during the adsorption or desorption operations.

Accordingly in accordance with this aspect of applicants' invention a fixed bed of solid adsorbent material, such as Linde Type 5A Molecular Sieve, is contacted with a vaporized hydrocarbon mixture, such as a naphtha fraction containing straight chain hydrocarbons and non-straight chain hydrocarbons, at a temperature in the range 200–600° F. such that the straight chain hydrocarbons are preferentially adsorbed from the hydrocarbon mixture. Following the above-indicated adsorption operation the adsorbent material, now substantially saturated with respect to staight chain hydrocarbons, is contacted with a hot non-wetting liquid, such as molten Wood's metal, at a temperature in the range 700–1000° F. sufficiently high to desorb substantially all of the adsorbed straight chain hydrocarbons from the adsorbent. Following the above-described desorption operation the thus-regenerated adsorbent is in condition to be contacted with additional hydrocarbon mixture for the selective adsorption of straight chain hydrocarbons therefrom.

This application is related to co-pending, co-assigned patent application Serial No. 511,949, filed May 31, 1955, in the name of H. V. Hess, one of the co-inventors of this invention, which broadly discloses and claims selective adsorbents contained within a porous envelope.

As will be apparent to those skilled in the art in the light of this disclosure many modifications and variations of this invention are possible without departing from the spirit or scope thereof.

We claim:

1. A method of desorbing straight chain hydrocarbons from a selective adsorbent which contains straight chain hydrocarbons adsorbed therein to the substantial exclusion of non-straight chain hydrocarbons which comprises contacting said adsorbent with a metallic liquid maintained at a temperature sufficient to effect desorption of said straight chain hydrocarbons from said adsorbent, said liquid being non-wetting with respect to said adsorbent and substantially unadsorbed by said adsorbent.

2. A method of desorbing adsorbate from a selective adsorbent containing the same, said adsorbent being contained within a porous encapsulating medium, which comprises contacting said adsorbent with a metallic liquid at an elevated temperature sufficient to effect desorption of said adsorbate from said adsorbent, said liquid being non-wetting with respect to said adsorbent and substantially unadsorbed by said adsorbent.

3. A method of fractionating a hydrocarbon mixture containing straight chain hydrocarbons and non-straight chain hydrocarbons which comprises contacting said mixture with a solid adsorbent which selectively adsorbs straight chain hydrocarbons to the substantial exclusion of non-straight chain hydrocarbons to adsorb straight chain hydrocarbons from said mixture and contacting the resulting adsorbent containing straight chain hydrocarbons adsorbed therein with a liquid low-melting point metal alloy at an elevated temperature sufficiently high to effect desorption of said straight chain hydrocarbons from said adsorbent, said liquid metal alloy being non-wetting with respect to said adsorbent and being substantially unadsorbed by said adsorbent.

4. A method of desorbing adsorbate from a selective adsorbent containing the same, said adsorbent being contained within a porous encapsulating medium, which comprises contacting said adsorbent with a metallic liquid at an elevated temperature sufficient to effect desorption of said adsorbate from said adsorbent, said liquid being non-wetting with respect to said adsorbent and wetting with respect to said encapsulating medium and being substantially unadsorbed by said adsorbent.

5. A method of fractionating a mixture which comprises contacting said mixture with a fixed bed of solid particle form selective adsorbent which selectively adsorbs a component of said mixture, recovering a treated mixture having a reduced amount of said component therein and contacting said adsorbent, now containing at least a portion of said component selectively adsorbed therein, with a metallic liquid maintained at a temperature sufficiently high to effect desorption of said component from said adsorbent, said liquid being non-wetting with respect to said adsorbent and substantially unadsorbed by said adsorbent.

6. A method of fractionating a hydrocarbon mixture which comprises contacting said mixture in the vapor phase with a solid particle form selective adsorbent which selectively adsorbs a component of said mixture, said adsorbent being encapsulated within a porous envelope, passing the thus encapsulated solid adsorbent now containing a component of said hydrocarbon mixture preferentially adsorbed therein into contact with a body of a high temperature metallic liquid which is non-wetting with respect to said adsorbent, said liquid being maintained at a temperature sufficiently high to effect substantially complete desorption of the adsorbed component from said adsorbent and being substantially unadsorbed by said adsorbent, separately recovering the thus-desorbed component and recycling the resulting regenerated encapsulated adsorbent to contact with additional said hydrocarbon mixture.

7. A method of fractionating a hydrocarbon mixture containing straight chain hydrocarbons and non-straight chain hydrocarbons which comprises introducing a vaporized hydrocarbon mixture into the lower end of an adsorption zone provided with a downwardly moving mass of solid particle form alumino-silicate selective adsorbent material which preferentially adsorbs straight chain hydrocarbons to the substantial exclusion of non-straight chain hydrocarbons, said alumino-silicate adsorbent material being contained within a porous encapsulating medium, so as to preferentially adsorb straight chain hydrocarbons from said hydrocarbon mixture, separately recovering from the other upper end of said adsorption zone a treated hydrocarbon mixture having a substantially reduced straight chain hydrocarbon content, maintaining in said lower end of said adsorption zone a body of relatively cool desorbing metallic liquid, said desorbing liquid being non-wetting with respect to said alumino-silicate adsorbent material and substantially unadsorbed by said alumino-silicate adsorbent, moving the encapsulated adsorbent material downwardly through said body of relatively cool desorbing liquid and upwardly through a body of relatively hot desorbing metallic liquid maintained in a desorption zone, said relatively hot desorbing metallic liquid being maintained therein at a temperature sufficiently high to effect desorption of the adsorbed straight chain hydrocarbons from said adsorbent material, separately recovering the resulting desorbed straight chain hydrocarbons and recycling the resulting regenerated adsorbent material to said other upper end of said adsorption zone.

8. A method of fractionating a hydrocarbon mixture containing straight chain hydrocarbons and non-straight chain hydrocarbons which comprises contacting said hydrocarbon mixture in the gaseous phase with a solid particle form alumino-silicate selective adsorbent material which preferentially adsorbs straight chain hydrocarbons to the substantial exclusion of non-straight chain hydrocarbons to adsorb straight chain hydrocarbons from said mixture, said adsorbent material being encapsulated within a porous envelope, separately recovering a resulting treated hydrocarbon mixture having a reduced straight chain hydrocarbon content, immersing the resulting said encapsulated adsorbent material in a bath of a molten metal alloy which is maintained at a temperature sufficiently high to effect substantially complete desorption of the adsorbed straight chain hydrocarbons contained adsorbed in said encapsulated adsorbent material and which is substantially unadsorbed by said adsorbent material, separately recovering the resulting desorbed straight chain hydrocarbons, separately recovering the resulting regenerated desorbed encapsulated adsorbent material and recycling the same to contact additional said hydrocarbon fraction.

9. A method of fractionating a hydrocarbon mixture containing straight chain hydrocarbons and non-straight chain hydrocarbons which comprises introducing said vaporized hydrocarbon mixture into the lower end of an adsorption zone containing a downwardly moving mass of solid alumino-silicate adsorbent material which preferentially adsorbs straight chain hydrocarbons to the substantial exclusion of non-straight chain hydrocarbons, said adsorbent being encapsulated within a porous envelope, recovering from the upper end of said adsorption zone a resulting treated hydrocarbon mixture having a reduced proportion of straight chain hydrocarbons, withdrawing from the lower end of said adsorption zone at a point below the point of injection of said vaporized hydrocarbon feed mixture said adsorbent material containing straight chain hydrocarbons preferentially adsorbed therein, introducing the resulting removed adsorbent material into the lower end of a regeneration-elevating zone wherein it is passed into countercurrent contact with a hot desorbing metallic liquid which is maintained at a temperature sufficiently high to effect desorption of the adsorbed straight chain hydrocarbons from said adsorbent material, said liquid being non-wetting with respect to said adsorbent material and substantially unadsorbed by said adsorbent material, recovering from the upper end of said regeneration-elevating zone the desorbed straight chain hydrocarbons and introducing the thus-regenerated desorbed adsorbent material into the upper end of said adsoption zone to contact additional vaporized hydrocarbon mixture.

10. A method of fractionating a hydrocarbon mixture containing straight chain hydrocarbons and non-straight chain hydrocarbons which comprises introducing vaporized said hydrocarbon mixture into the lower end of an adsorption zone into countercurrent contact with a downwardly moving mass of solid alumino-silicate adsorbent material which selectively adsorbs straight chain hydrocarbons to the substantial exclusion of non-straight chain hydrocarbons, said adsorbent material being contained within a porous encapsulating medium, recovering from the upper end of said adsorption zone a treated hydrocarbon mixture having a reduced amount of straight chain hydrocarbons, introducing into the upper portion of an adsorbent regeneration zone said encapsulated adsorbent material now containing straight chain hydrocarbons preferentially adsorbed therein, contacting said adsorbent material within said adsorbent regeneration zone with a hot desorbing metallic liquid which is non-wetting with respect to said adsorbent material at a temperature sufficiently high to effect desorption of the adsorbed straight chain hydrocarbons from said adsorbent material, said liquid being non-wetting with respect to said adsorbent material and substantially unadsorbed by said adsorbent material, recovering from lower end of said adsorbent regeneration zone resulting hot regenerated encapsulated adsorbent material, passing said hot regenerated encapsulated adsorbent material into the upper end of an adsorbent cooling zone, contacting said encapsulated adsorbent material within said adsorbent cooling zone with relatively cool metallic liquid which is non-wetting with respect to said adsorbent material so as to reduce the temperature of regenerated adsorbent material introduced into said adsorbent cooling zone to a temperature substantially the same as the adsorption temperature maintained in said adsorption zone and which is substantially unadsorbed by said adsorbent material and introducing the thus-cooled adsorbent material into the upper end of said adsorption zone.

11. A method of fractionating a hydrocarbon mixture containing straight chain hydrocarbons and non-straight chain hydrocarbons in accordance with claim 18 wherein said hot desorbing metallic liquid is non-wetting with respect to said adsorbent material and wetting with respect to said encapsulating medium and wherein the temperature of said hot desorbing metallic liquid employed in the desorption operation is higher than the critical temperature of the straight chain hydrocarbons contained adsorbed in said adsorbent material within said regeneration zone and possessing the highest critical temperature of the adsorbed straight chain hydrocarbons.

References Cited in the file of this patent

UNITED STATES PATENTS

| | | |
|---|---|---|
| 2,001,828 | Smith | May 21, 1935 |
| 2,306,610 | Barrer | Dec. 29, 1942 |
| 2,331,521 | Utterback | Oct. 12, 1943 |
| 2,381,371 | Utterback | Aug. 14, 1945 |
| 2,398,818 | Turner | Apr. 23, 1946 |
| 2,623,607 | Bottum | Dec. 30, 1952 |
| 2,643,972 | Weedman | June 30, 1953 |

OTHER REFERENCES

Sunier et al.: Jour., Ind. and Eng. Chem., vol. 2, No. 1, January 15, 1930, pp. 109–113 (page 113 only needed).

UNITED STATES PATENT OFFICE
CERTIFICATE OF CORRECTION

Patent No. 2,859,257

November 4, 1958

Howard V. Hess et al.

It is hereby certified that error appears in the printed specification of the above numbered patent requiring correction and that the said Letters Patent should read as corrected below.

Column 1, line 39, for "confiugration" read -- configuration --; column 5, line 69, for "numerals" read -- numeral --; column 14, line 32, for the claim reference numeral "18" read -- 10 --.

Signed and sealed this 3rd day of February 1959.

(SEAL)
Attest:

KARL H. AXLINE
Attesting Officer

ROBERT C. WATSON
Commissioner of Patents